United States Patent [19]

Carrens

[11] 4,350,082
[45] Sep. 21, 1982

[54] PUMP PISTON HAVING RING LUBRICATION MEANS

[75] Inventor: Donald E. Carrens, Tulsa, Okla.

[73] Assignee: Dresser Industries, Inc., Dallas, Tex.

[21] Appl. No.: 17,755

[22] Filed: Mar. 5, 1979

[51] Int. Cl.³ .................. F01M 11/02; F04B 17/00; F16J 1/08
[52] U.S. Cl. ........................... 92/159; 92/182; 277/173; 417/393; 417/397
[58] Field of Search ............ 92/182, 158, 159, 162 R, 92/162 P; 277/173, 169, 170, 168, 74; 417/397, 393

[56] References Cited

U.S. PATENT DOCUMENTS

| 1,534,198 | 4/1925 | Wilson | 277/170 |
|---|---|---|---|
| 1,667,548 | 4/1928 | Hanch | 92/158 |
| 3,135,210 | 6/1964 | English | 417/397 |
| 3,386,346 | 6/1968 | Halpin | 277/173 X |
| 3,396,976 | 8/1968 | Reinhoudt et al. | 92/162 R |
| 3,489,130 | 1/1970 | Polidan et al. | |
| 3,544,118 | 12/1970 | Klein | 92/162 R |
| 3,582,238 | 6/1971 | Devine | 417/397 |
| 3,733,973 | 5/1973 | Elsbett et al. | 92/159 |
| 3,922,116 | 11/1975 | Pugh | 417/393 |
| 4,103,594 | 8/1978 | Geffroy | 92/159 |
| 4,118,154 | 10/1978 | Roeder | 417/402 |
| 4,174,112 | 11/1979 | Carrens | 277/205 |

FOREIGN PATENT DOCUMENTS

| 797284 | 2/1936 | France | 277/168 |
|---|---|---|---|
| 1359821 | 7/1974 | United Kingdom | 417/397 |

Primary Examiner—Irwin C. Cohen
Attorney, Agent, or Firm—J. N. Hazelwood; W. R. Peoples

[57] ABSTRACT

A downhole oil well hydraulic pump has a reciprocating piston assembly with a piston ring mounted in a groove around the piston. This piston ring groove has a main portion which loosely mounts a piston ring and an auxiliary portion joining the main portion which accumulates well fluid to lubricate the piston ring during operation of the pump.

5 Claims, 4 Drawing Figures

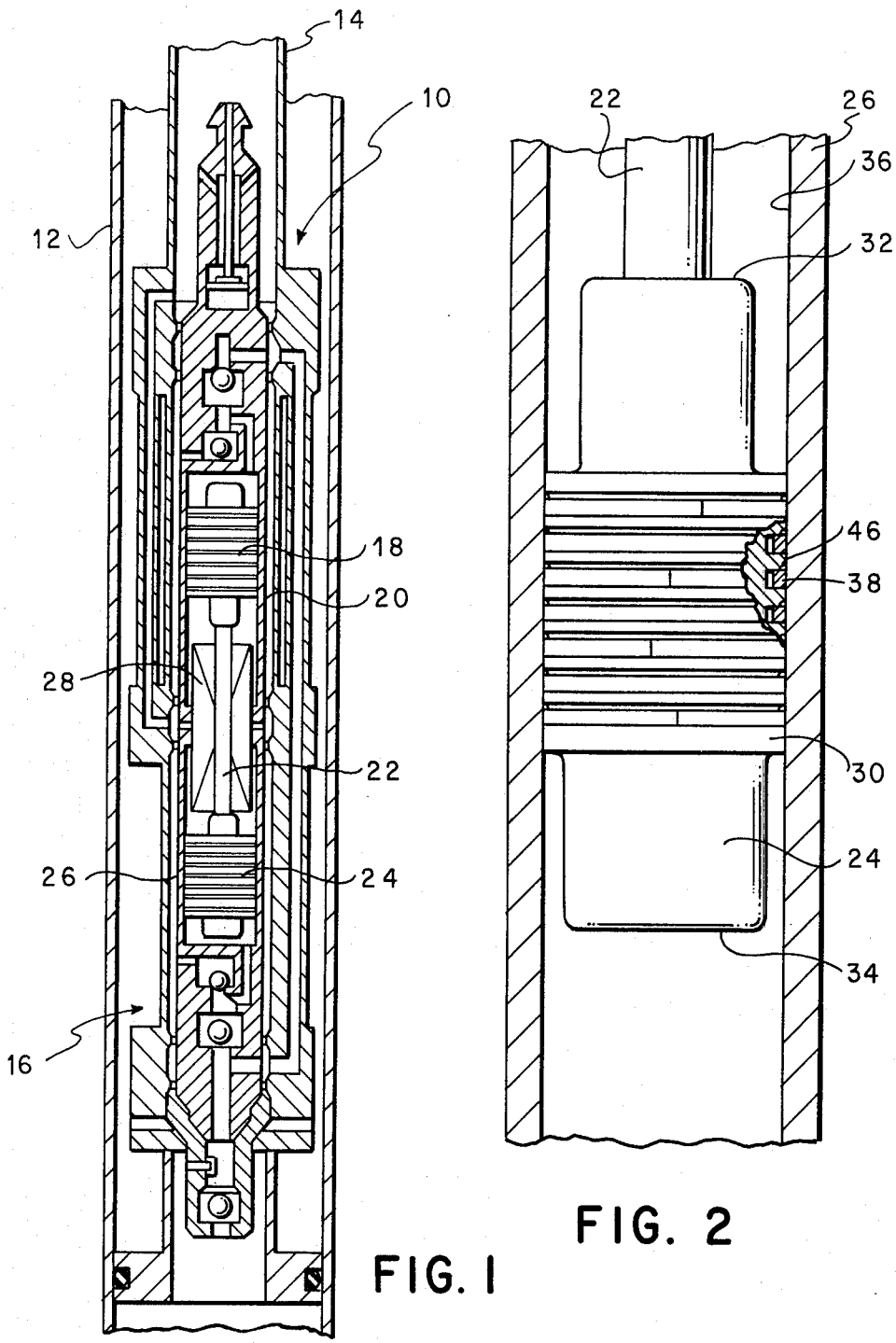

PUMP PISTON HAVING RING LUBRICATION MEANS

TECHNICAL FIELD

This invention is related to a piston construction for a downhole oil well hydraulic pump having a reciprocating piston assembly. More specifically this invention is related to a feature of a pump piston which lubricates the piston rings.

The pistons used heretofore in downhole hydraulic well pumps are provided with substantially cross-sectionally rectangular piston grooves and correspondingly shaped piston rings. Basically these prior art piston groove and ring constructions do not have provisions for accumulating a lubricating fluid around the piston ring other than in the very small clearances provided for assembly and thermal expansion.

SUMMARY OF THE INVENTION

An embodiment of the piston of this invention includes a generally cylindrical piston body having a groove therearound to receive and loosely mount a piston ring. The piston ring groove is formed with a main portion in which the piston ring is mounted and an attached or connected auxiliary portion in which well fluid can accumulate for lubrication of the piston ring during operation of the pump.

One object of this invention is to provide a well pump piston which will allow the well fluid to accumulate in small quantities around the piston rings to lubricate the piston rings without causing a significant fluid leakage past the piston rings.

Another object of this invention is to provide a well pump piston which has grooves therearound to accumulate well fluid thus lubricate and prolonging the operational life of the piston rings and accordingly the associated well pump.

Various other objects, advantages and features of this invention will become apparent to those skilled in the art from the following discussion, taken in conjunction with the accompanying drawings, in which:

DESCRIPTION OF THE DRAWINGS

FIG. 1 is a simplified cutaway elevation view of a downhole oil well pump having a reciprocating piston assembly and utilizing the piston ring lubrication means of this invention with the two pistons thereof;

FIG. 2 is an enlarged partially cutaway elevation view of the lower piston and a portion of the associated cylinder from the pump shown in FIG. 1;

Figure 3:
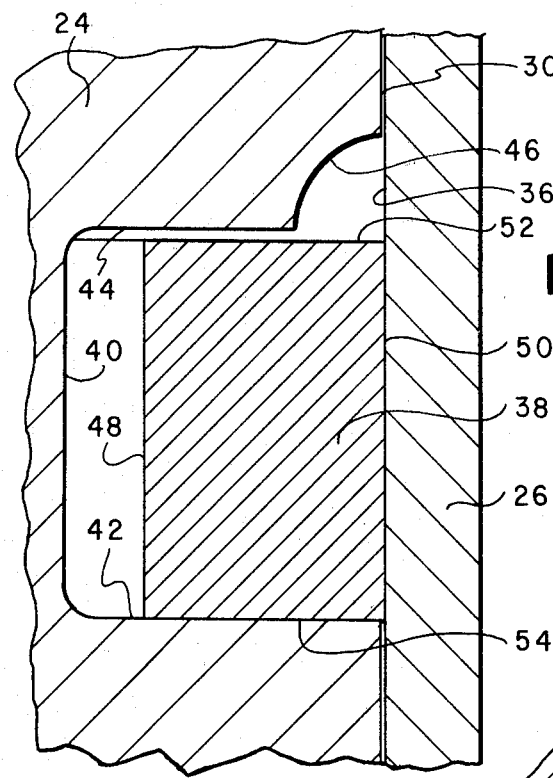
FIG. 3 is an enlarged cross-sectional fragmentary view of a portion of the piston, piston ring and cylinder taken from FIG. 2 with the piston ring positioned against the piston ring groove lower wall and having an arrow indicating the direction of motion of the piston.

The following is a discussion and description of preferred specific embodiments of the piston ring lubrication means of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a downhole oil well hydraulically powered pump, indicated generally at 10, mounted in a segment of well casing 12 and supported by a tubing string 14 from the earth surface. The piston assembly and associated valving portion of the pump is mounted in a bottom hole receptacle, indicated generally at 16. The piston assembly includes and upper piston 18 mounted within an upper cylinder 20. A piston rod 22 connects upper piston 18 to a lower piston 24 that is likewise mounted within a lower piston cylinder 26. A hydraulic reversing control valve 28 is mounted between the pistons and surrounds the piston rod 22 at the juncture of the cylinders. Because the function of the many elements of the pump are not relevant to the piston construction, a description of the operating elements and functions of the pump will not be included in this description.

FIG. 2 shows lower piston 24 positioned within lower cylinder 26, and a portion of the piston rod 22. Piston 24 is a generally cylindrically shaped member having a cylindrical outer peripheral surface 30, an upper end 32 and a lower end 34. Piston ends 32 and 34 are transverse to the general longitudinal axis of the piston. Piston rod 22 is mounted with piston 24 at its upper end 32. Piston outer peripheral surface 30 is sized to slide within cylinder bore 36. A plurality of piston ring grooves are formed around the outer periphery of the piston and oriented in a spaced relation to each other. These piston ring grooves open to the piston outer peripheral surface 30.

Figure 4:
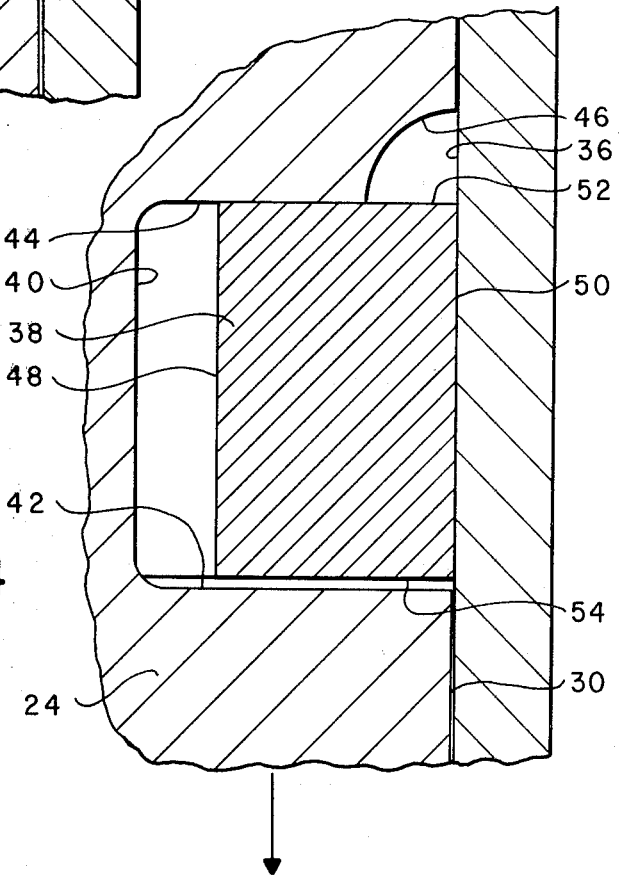
FIG. 4 is an enlarged fragmentary elevation view similar to FIG. 3 with the piston ring positioned against the piston ring groove upper wall and an arrow indicating the direction of motion of the piston.

FIGS. 3 and 4 show a single piston ring groove in an enlarged configuration with a piston ring 38 mounted therein. The piston ring groove includes a main portion and an attached or connected auxiliary portion on the upper outer peripheral portion of one side thereof. The piston ring main groove portion includes an inner wall 40, a lower wall 42 and an upper wall 44. Upper and lower walls 42 and 44 are both generally perpendicular to groove inner wall 40 and to the piston outer peripheral surface 30. The piston ring auxiliary groove portion includes a curved or arcuate surface 46 connected on one end to groove upper wall 44 and on the other end thereof to piston outer peripheral surface 30 thereby defining an annular segment of the piston groove which opens to the piston groove main portion and to the pistons peripheral exterior. Auxiliary groove portion 46 can be constructed as shown in FIG. 3 in a cross-sectionally partially circularly shape. The depth of auxiliary groove portion 46 can vary in dimension at the desire of the user to suit his particular need. More specifically, auxiliary groove portion 46 can be approximately one-third, or less, of the depth of the groove main portion.

It is to be noted that this piston ring auxiliary groove portion can have a shape other than the curved or arcuate surface 46 as shown. The auxiliary groove portion can be formed in virtually any shape which will permit a small reservoir of well fluid to accumulate alongside the piston ring. For example this auxiliary groove portion can be essentially rectangular in cross-section, or it can be a simple chamfer, or it can be a composite of planar surfaces alone at varying angles or a composite shape of planar surfaces in combination with curved surfaces.

Piston ring 38 is a solid and generally cross-sectionally rectangular annular member having an inner side 48, an outer side 50, an upper side 52 and a lower side 54. Piston ring inner and outer sides 48 and 50 have a cylindrical curvature in the direction of the longitudinal axis of the piston. It is to be noted that when piston ring outer surface 50 is in contact with cylinder bore 36, a space is present between piston groove inner wall 40 and piston ring inner surface 48. Piston ring upper side 52 and lower side 54 are planar in the direction transverse to the pistons longitudinal axis and they are substantially parallel to groove lower wall 42 and groove upper wall 44. It is to be noted that the longitudinal dimension of piston ring 38 is such that when piston ring lower side 54 and groove lower wall 42 are in contact, there is a space between piston upper side 52 and groove upper wall 44.

FIG. 3 shows the orientation of piston ring 38 within piston 24 when the piston is moving upward in cylinder 26. In this condition, piston ring 38 is displaced with its lower side 54 against piston ring groove lower wall 42. When this occurs, the power fluid which is on the upper side of piston 24 can flow through the space between piston cylinder bore 36 and piston outer peripheral surface 30, through the groove auxiliary portion and into the cavity defined between the piston ring groove and the piston ring. When this occurs, the fluid will provide lubrication for the piston ring as it moves through the cylinder due to the small reservoir of fluid which is located immediately ahead of the piston ring. Also, it permits fluid to lubricate the juncture of piston ring lower side 54 and piston ring groove lower wall 42 which provides lubrication for the piston ring as it moves radially inward and outward in expanding and contracting motions during movement through the cylinder.

FIG. 4 shows the position of piston ring 38 when piston 24 is moving in the downward direction as indicated by the arrow. It is to be noted that under some operating conditions of a downhole well pump, piston ring upper side 52 may be in contact with piston groove upper wall 44. With piston ring 38 in this position, fluid communication between the groove auxiliary portion and the groove main portion are effectively cut off. At this time, fluid in the space between piston ring inner side 48 and the piston ring groove inner wall 40 is communicated to the space between piston ring lower side 54 and piston ring groove lower wall 42 and the annular space between cylinder bore 36 and piston outer peripheral surface 30. This arrangement of spaces allows a quantity of lubricating fluid to accumulate ahead of the downwardly moving piston ring thereby lubricating the piston ring in its motion through cylinder bore 36. When the piston ring 38 shifts from groove lower wall 42 to groove upper wall 44, a pumping action occurs to forcefully displace the fluid contained within the piston ring groove. This pumping action can forcefully displace the fluid from one side of piston ring 38 to the other in small quantities but yet sufficient quantities for lubrication of the piston ring to be effective in reducing friction.

The displacement of fluid around or over the rings of a piston with this novel groove construction will reduce the force necessary to displace the piston in the cylinder bore and will also provide a medium for dissipating heat generated by friction between the piston ring and the internal surface of the cylinder bore. In a piston having a plurality of piston rings, such as shown in FIG. 2, only a very small amount of fluid is displaced past the inner side of the piston rings during reciprocating motion of the piston. This fluid transfer is not sufficient to present a significant degrading of the peripheral seal around the piston as formed by the piston rings but it is sufficient to transport heated fluid from the zone of the piston rings to the piston chambers where it is removed from the pump.

Some pumps are designed to maintain a pressure differential across the piston(s) thereof in one direction regardless of the operating mode or condition while others are constructed to permit an alternating pressure differential across the piston(s). In pumps having the alternating pressure differential, the piston ring will move as shown in FIGS. 3 and 4. For this type of pump, the piston ring will be lubricated as described with the shifting piston ring. In the other type of pumps, the situation is slightly different but the piston ring will still be lubricated because of this novel groove construction.

It is to be noted that some operating conditions of the downhole oil well pump shown in FIG. 1 will cause piston ring 38 to be biased or maintained at substantially all times in the position shown in FIG. 3 during both upward and downward motion of the piston. During these operating conditions, well fluid can accumulate in the auxiliary groove portion of the piston groove and provide lubrication during upward and downward motion of the piston assembly. During upward motion of the piston assembly, this fluid travels ahead of piston ring 38 as described above. During downward motion of the piston assembly, the well fluid will accumulate in one auxiliary groove portion of a piston ring groove and lubricate cylinder bore 36 ahead of the following piston ring by fluid flowing into the small annular space between piston outer peripheral surface 30 and cylinder wall 36.

From the foregoing it is seen that the novel piston ring groove construction of this invention provides a means to lubricate the piston rings during upward and downward motion of the piston assembly. This novel piston ring groove construction provides an auxiliary groove portion which is in fluid communication with the piston ring groove main portion, the outer peripheral surface of the piston and the piston cylinder bore to provide a reservoir of lubricating fluid for lubricating the piston rings during operation of the pump. The novel groove construction is arranged to work equally well in pumps constructed with piston rings that oscillate in the ring grooves as well as those which normally remain at one side of the ring grooves. In addition to providing lubrication for the piston assembly, the novel piston ring construction of this invention provides a medium by which heat that is generated due to friction of the piston assembly can be displaced from the piston assembly.

The embodiments of the invention in which an exclusive property or privilege is claimed are defined as follows:

1. In a downhole oil well pump apparatus having a reciprocating double acting piston assembly mounted within a bore, an improvement therein comprising:
   (a) a generally cylindrical piston at each end of said bore with the outer cylindrical peripheral surface thereof slightly smaller than said bore, said piston having a first end portion open to hydraulic well power fluid to drive said piston and a second opposed end portion open to fluid to be pumped;

(b) a plurality of annular piston ring grooves around the outer periphery of said piston and opening to said outer cylindrical peripheral surface thereof, said piston ring groove including a main portion having an upper wall, a lower wall and a continuous inner wall arranged to provide a space of sufficient cross-section to loosely mount a piston ring, each said groove further including an auxiliary portion of a smaller width and depth than and connecting to said main portion, said auxiliary groove portion being located at one side of said groove main portion toward said first end portion of said piston, and opening substantially to said outer peripheral surface;

(c) a piston ring loosely mounted in said groove main portion and having upper and lower sides for abutting engagement with said upper and lower walls, respectively, for substantially blocking free flow of hydraulic power fluid flow therethrough during operation of said pump when said piston ring is displaced within said groove toward the side thereof which does not have said auxiliary portion in order to permit hydraulic well power fluid to accumulate around said piston ring in order that said hydraulic well power fluid will provide lubrication for said upper and lower sides of said piston ring as it moves in said bore; and wherein said pump apparatus has one of said pistons mounted on each end of a pump rod, and said groove auxiliary portion of each piston is located on said one side of said main groove portion toward mutually facing end portions of said pistons.

2. A downhole oil well pump apparatus having a reciprocating piston assembly mounted within a bore, wherein the piston assembly includes:

(a) a generally cylindrical piston body with hydraulic power fluid end, a pumped fluid end, and an outer cylindrically shaped peripheral surface, said surface being slightly smaller than said bore;

(b) a plurality of annular grooves around the outer periphery of said piston and opening to said peripheral surface, each said groove including a main portion having an upper wall, a lower wall and a continuous inner wall arranged to provide a space of sufficient width and depth to accommodate a piston ring, and an auxiliary portion of a smaller width and depth at the side of said groove main portion toward said hydraulic power fluid end of said piston and opening to said peripheral surface, said upper wall extending in a generally radial direction adjacent said auxiliary portion; and (c) a piston ring mounted in said groove main portion and having a continuous, cylindrically planar outer surface extending parallel with said peripheral surface, being of a smaller width radially than said groove main portion, and of a smaller thickness than the axial depth of said groove main portion, said piston ring being disposed within said groove in substantial abutting engagement with one or the other of said upper and lower walls so as to substantially block the free flow of hydraulic power fluid through said main groove such that hydraulic well power fluid flows into portions of said annular groove that are not occupied by said piston ring to accumulate therein in order that said well power fluid provides lubrication for said piston and said upper and lower walls of said piston ring when moving in said bore.

3. The improvement of claim 2, wherein:
(a) said upper and lower walls of said groove main portion are substantially parallel;
(b) said piston ring has substantially parallel upper and lower sides which contact said upper and lower walls, respectively; and
(c) said groove auxiliary portion is defined by a curve arcuate surface joining said piston outer peripheral surface and said upper wall of said groove main portion.

4. The apparatus of claim 2 including two of said pistons, one being mounted on each end of a pump rod, and said groove auxiliary portions located on the sides of said groove main portions facing towards the opposite piston.

5. In a downhole pump apparatus having a cylinder with a piston disposed therein, a hydraulic power fluid chamber within one end of said cylinder and a pumped fluid chamber at the other end of said cylinder, a plurality of annular grooves opening radially from said piston, each said groove having a main portion defined by longitudinally spaced side walls with a continuous interior wall connected therebetween, a piston ring having a longitudinal thickness less than the spacing between said side walls and disposed within said groove main portion, said ring having opposite sides conforming to the configuration of said main groove portion side walls, one of said piston ring sides engaging a selected one of said main groove portion side walls during movement of said piston in said cylinder to block substantial flow of hydraulic power fluid through said main groove portion, and the improvement in said assembly comprising a groove auxiliary portion of lesser depth and width than said main groove portion and formed in said piston and communicating between said cylinder and the side wall of said main groove portion toward said hydraulic power fluid chamber and each said main groove portion with a substantial area of said auxiliary portion opening into said cylinder for collecting hydraulic power fluid therein for lubrication between said sides of said ring and said main portion side walls during reciprocation of said piston in said cylinder.

* * * * *